March 15, 1966     E. H. OLSON ETAL     3,240,626
ELECTRICAL CONDUCTOR HAVING A FIRST LAYER COMPRISING
A THERMOSET POLYESTER RESIN AND A CROSS-LINKED
THERMOSET OUTER POLYESTER RESIN COATING
Filed Oct. 23, 1962
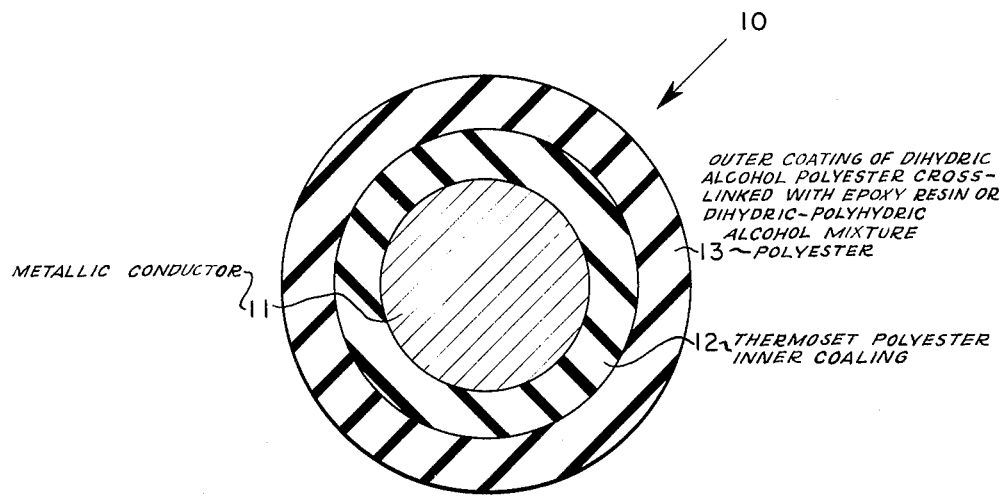
INVENTORS
EMIL H. OLSON
RUDOLPH P. ARNDT
BY
ATTORNEYS United States Patent Office 3,240,626
Patented Mar. 15, 1966

3,240,626
ELECTRICAL CONDUCTOR HAVING A FIRST LAYER COMPRISING A THERMOSET POLYESTER RESIN AND A CROSS-LINKED THERMOSET OUTER POLYESTER RESIN COATING
Emil H. Olson, North Muskegon, and Rudolph P. Arndt, Muskegon, Mich., assignors, by mesne assignments, to Anaconda Wire and Cable Company, a corporation of Delaware
Filed Oct. 23, 1962, Ser. No. 232,550
10 Claims. (Cl. 117—218)

This invention relates to insulated electrical conductors, and more particularly, to conductors having a plurality of dielectric coatings of thermostat resins characterized by resistance to heat shock and to solvent shock.

The use of thermosetting polyester resins as dielectric coatings for magnet wire has been known for some time. The polyesters used commercially are usually reaction products of polyethylene terephthalate and mixtures of glycol and glycerine or pentaerythritol. Such resins are classed as 155° C. (Type F) insulation and exhibit resistance to abrasion and solvents. However, coatings of these resins have been shown to be susceptible to heat shock or solvent shock which causes crazing and/or cracking of the insulation. Exposure of coils of wire coated with the prior art Type F resins, to excessive heat, or immersion of the coils in certain solvents frequently occurs in use. Hence, the prior art resins have had serious disadvantages which frequently restrict their use in very important areas of the appropriate arts.

Susceptibility to heat shock can be overcome by applying a coating of a thermoplastic material to conductors previously coated with the Type F resins referred to above. The thermoplastic materials heretofore employed have been nylon or linear polyester resins. Such coatings lack the solvent resistance and beneficial high temperature properties of thermosetting coatings, however. Moreover, wires with thermoplastic overcoats have been known to exhibit severe surface flow under winding pressures and temperatures. The overcoats themselves are often sandy and wavy, which makes it impossible to make efficient use of available wire space without unduly sacrificing the insulating efficiency of the coating.

It is therefore the purpose of this invention to provide an insulated conductor with a composite coating of an inner dielectric thermoset resin and an outer modified thermoset resin applied over the inner coating. Such a composite coating provides the benefits of prior art thermoset insulation, but in addition, furnishes an insulated conductor with improved resistance to heat shock and solvent shock, and exhibits excellent flexibility after aging at elevated temperatures for long periods of time.

It is a further purpose of this invention to provide a novel and useful overcoating for electric wires and cables having a standard, thermoset resin coating. The overcoat subsists in the form of an infusible and insoluble film or coating, the molecular structure of which is a cross-linked polyester, having a uniform consistency and characterized by desirable dielectric properties. The cross-linked structure of the coating produces far better insulated wire than does the ordinary linear, thermoplastic resins used for the same purposes in the prior art.

These and other purposes of this invention will be explicitly described or may be inferred from the following description and drawings. In the drawings, the figure is a section of an insulated conductor of this invention.

The insulated conductor of this invention comprises a metallic electrical conductor, an inner dielectric coating of a polyester thermoset resin, preferably a terephthalate polyester, and an outer coating of a dielectric thermoset resin covering the inner coating. The resin of the outer coating exhibits resistance to heat shock produced by exposure to a temperature of 175° C. for at least two hours; it exhibits resistance to solvent shock produced by boiling in xylene for at least 10 minutes; and it is characterized by flexibility after heat aging at 190° C. for at least one week. The resin of the outer coating preferably comprises from 30% to 80% by weight of a dihydric alcohol and an aromatic dicarboxylic acid, preferably terephthalic acid, up to 60% by weight of a polyester of an aromatic dicarboxylic acid (preferably terephthalic acid) and a mixture of a glycol and a polyhydric alcohol having at least 3 hydroxyl groups, up to 50% by weight of a high molecular weight epoxy resin, up to 20% by weight of a polyvinyl formal resin and from 0.1% to 12% by weight of an interesterifying or cross-linking catalyst, preferably zinc naphthenate.

Referring to the figure, an insulated conductor, generally indicated by the numeral 10 comprises an electric conductor 11 of a metal such as copper, coated with a cured thermosetting resin 12, such as preferably a terephthalate polyester resin or a terephthalate polyester-cyanurate resin. The conductor 11 with a coating 12 may be adequate for many purposes but it is apt to have poor heat shock and solvent shock resistance, and to lack flexibility after heat aging. The coating 12 is therefore overcoated with an overcoating 13 described herein.

The outer coating 13 of this invention may comprise a thermset polyester such as a high molecular weight polyester of a dihydric alcohol and an aromatic dicarboxylic acid and a cross-linking catalyst. It may also comprise an epoxy resin with a polyester of terephthalic acid and a mixture of glycol and a polyhydric alcohol containing at least 3 hydroxyl groups, and a cross-linking catalyst. The cross-linking catalyst is preferably zinc naphthenate, the optimum quantity added being from 0.1% to 12% by weight. Moreover, the preferred aromatic dicarboxylic acid is terephthalic acid.

The overcoat resin 13 includes a high proportion of the polyester of mixed glycol and glycerol or pentaerythritol. Multron R–38, supplied by the Mobay Chemical Company of Pittsburgh, Pennsylvania, is particularly useful, having 63 mols of glycol to 32 mols of glycerine esterified with terephthalic acid. Multron R–38 is also an ingredient of a typical hard-cured enamel which may form the undercoat 12 of the insulated conductor of this invention. The outer coating 13 preferably also includes Epi Rez 560, an epoxy bisphenol-A resin, having a melting point of 166° C. and a molecular weight per epoxide of 4641. Epi Rez 560 is marketed by the Jones-Dabney Company Division of the Devoe-Reynolds Company of Louisville, Kentucky.

The desirable properties of the thermoset resin overcoat 13 of this invention can be attributed to the synergistic combination of an aromatic dicarboxylic acid, an epoxy resin or the equivalent and cross-linking catalyst. More particularly, the combination of terephthalate polyesters with an epoxy resin and a cross-linking catalyst, such as zinc naphthenate yields a resin suitable for coating conductors which evinces heretofore unobtainable resistance to heat shock, solvent shock and embrittlement during aging at high temperatures.

The following examples will illustrate specific embodiments of the resins efficacious in this invention, but should in no way be construed as limiting the scope of the invention as defined in the appended claims.

*Example 1*

A standard inner coating was applied to A.W.G. 18 wire in the form of a solution having the following solids content:

Parts by weight
Multron R–38 _____ 77.0

| | Parts by weight |
|---|---|
| Mondur SH | 22.4 |
| Zinc (as naphthenate) | 0.6 |

Mondur SH is the trade name of that isocanyanate which is the trimer of trisubstituted phenol or cresol blocked cyanuric acid. It has the property of modifying and cross-linking the polyester, thereby serving to increase the thermal stability and toughness of the polyester with which it is combined. The resin resulting from the combination of Multron R–38 and Mondur SH is known as a polyester cyanurate. Mondur SH is sold by the Mobay Chemical Company of Pittsburg, Pennsylvania.

The above undercoating mixture was applied in 4 coats to the wire, by passing the wire through a 38% solution of the resin in a blend of cresylic acid and a high-flash aromatic naphtha having a boiling range of 154° C. to 185° C. The solvent was volatilized off and the enamel was cured by baking each coat individually prior to applyin the next coat. Application and curing proceeded until a hard finish was obtained, and the undercoat had a wall thickness of 0.0012 inch. The wire thus undercoated was then overcoated with 2 coats of a 20% solution of:

| | Parts by weight |
|---|---|
| Polyvinyl acetal | 2.5 |
| Epi Rez 560 | 9.6 |
| Glycol-terephthalate polyester | 58.9 |
| Multron R–38 | 28.7 |
| Zinc (as naphthenate) | 0.3 |

The solvent for the above ingredients may be conveniently prepared by mixing 39 parts by weight of phenol, 26 parts of o-cresol and 35 parts of parachlorophenol. The solvent was evaporated after overcoating and each coat was baked individually to a dry, thermoset finish with a total overcoat wall thickness of 0.00025 inch.

*Example 2*

A wire provided with a standard undercoating of the kind disclosed in the first paragraph of Example 1 was overcoated with a 19.4% solution of the following:

| | Parts by weight |
|---|---|
| Epi Rez 560 | 16.0 |
| Glycol-terephthalate polyester | 65.2 |
| Multron R–38 | 18.5 |
| Zinc (as naphthanate) | 0.3 |

The solvent employed was the mixture of phenol, o-cresol and parachlorophenol also described in Example 1. It was evaporated after the application of the resin solution to the undercoated wire. The wire was then baked to a dry, thermoset finish.

*Example 3*

A wire provided with a standard undercoating of the kind disclosed in Example 1 was overcoated with an 18.3% solution of the following:

| | Parts by weight |
|---|---|
| Polyvinyl acetal | 2.6 |
| Epi Rez 560 | 28.9 |
| Glycol-terephthalate polyester | 67.5 |
| Zinc (as naphthenate) | 1.0 |

The solvent was evaporated and the wire baked to a dry, thermoset finish.

*Example 4*

An A.W.G. 18 wire, provided with a thermoset resin undercoat of the prior art, was coated with a 20.7% solution of:

| | Parts by weight |
|---|---|
| Epi Rez 560 | 28.6 |
| Multron R–38 | 28.6 |
| Dacron | 35.7 |
| Formvar 15/95S | 2.4 |
| Zinc (as naphthenate) | 0.4 |

The solvent was evaporated and the wire was baked to a dry, thermoset finish.

The wire of Example 1 and others made according to the same procedure were put through representative tests to determine their ability to withstand heat shock and solvent shock. The wire of Example 1 was elongated 10%, wrapped around a mandrel equal to its own diameter, and heated for 1 hour at 190° C. At the end of this period the enamel was examined and found to be free of cracks. Another wire insulated with the resin of Example 1 was elongated 15%, wrapped around a mandrel equal to twice its own diameter and submerged in boiling xylene for 10 minutes. At the end of this period the enamel was examined and found to be free of cracks. In a third test, a wire prepared according to Example 1 was aged for one week in an oven at 190° C., and then wound around a mandrel equal to its own diameter. The enamel was examined and found to be free of cracks. A wire provided with the undercoating of Example 1 without additional overcoats, as well as commercially available magnet wire having a thermoset polyester insulation undercoat and a thermoplastic polyester overcoat were each tested by the three procedures above. Both types of insulated wire exhibited large cracks and crazing after at least one of these three test procedures.

Wires of Examples 2, 3 and 4, as well as the wire of Example 1, were found to have superior heat shock, solvent shock and abrasion resistance and flexibility after heat aging. They are suitable for Class F applications.

An additional advantage of this invention is the high viscosity and solids attainable in the solution of the resin. This makes coating the undercoated wire easy and more successful than methods employing prior art resin solutions, since thin enamels of the prior art cannot be pumped with facility and will not fill the enameling die apertures. This contributes to the roughness or sandiness of the final product. Commercially available Dacron solutions are made at a maximum viscosity of 8 poises at 25° C. and solids of 15.5%, whereas the enamels of this invention can be made and employed at over 28 poises at 25° C. and over 20.0% solids.

We claim:

1. An insulated conductor comprising an electrical conductor, an inner dielectric coating of a polyester thermoset resin covering said conductor and an outer dielectric coating of a thermoset resin covering said inner coating, said resin of said outer coating: exhibiting resistance to heat shock produced by exposure to a temperature of 175° C. for at least 2 hours; exhibiting resistance to solvent shock produced by boiling in xylene for at least 10 minutes; and characterized by flexibility after heat aging at 190° C. for at least one week; said outer coating being resin which is a reaction product of materials selected from the group consisting of (a) 30% to 80% by weight of a high molecular weight polyester of a dihydric alcohol with an aromatic dicarboxylic acid, up to 50% by weight of an epoxy resin, and 0.1% to 12% by weight of a cross-linking catalyst, and (b) 30% to 80% of a high molecular weight polyester of a dihydric alcohol with an aromatic dicarboxylic acid up to 60% by weight of a polyester of terephthalic acid and a mixture of a glycol and a polyhydric alcohol with at least 3 hydroxyl groups, and 0.1% to 12% by weight of a cross-linking catalyst.

2. The insulated conductor of claim 1 wherein the said inner coating is a terephthalate polyester and said outer coating is a thermoset resin cross-linked to a lesser degree than said inner coating, said outer coating comprising up to about 50% by weight of epoxy resin, from about 30% to about 80% by weight of a high molecular weight polyester of a dihydric alcohol and an aromatic dicarboxylic acid, up to about 60% by weight of a polyester of an aromatic dicarobxylic acid and a mixture of a glycol and a polyhydric alcohol having at least 3 hydroxyl groups, up to about 20% by weight of a polyvinyl formal resin and from about 0.1% to about 12% by weight of an interesterifying catalyst.

3. The insulated conductor of claim 1 wherein the said inner coating is a terephthalate polyester-cyanurate and said outer coating is a thermoset resin cross-linked to a lesser degree than said inner coating, said outer coating comprising up to 50% by weight of epoxy resin, from 30% to 80% by weight of a dihydric alcohol and terephthalic acid, up to 60% by weight of a polyester of terephthalic acid and a mixture of a glycol and a polyhydric alcohol having at least 3 hydroxyl groups, up to 20% by weight of a polyvinyl formal resin and from 0.1% to 12% by weight of zinc naphthenate.

4. An insulated conductor comprising an electrical conductor, an inner dielectric coating of a polyester thermoset resin covering said conductor and an outer coating of a dielectric thermoset resin covering said inner coating, said outer coating subsisting in the form of an infusible and insoluble film and comprising from 30% to 80% by weight of a polyester which is the reaction product of terephthalic acid and glycol, up to 50% by weight of an epoxy resin and from 0.1% to 12% by weight of a cross-linking catalyst.

5. An insulated conductor comprising a metallic electrical conductor, an inner dielectric coating of a polyester thermoset resin covering said conductor and an outer dielectric coating of a thermoset resin covering said inner coating, said outer coating subsisting in the form of an infusible and insoluble film which is a reaction product of materials selected from the group consisting of (a) 30% to 80% by weight of a high molecular weight polyester of a dihydric alcohol with an aromatic dicarboxylic acid, up to 50% by weight of an epoxy resin and 0.1% to 12% by weight of an interesterifying catalyst; (b) from 30% to 80% by weight of a high molecular weight polyester of a dihydric alcohol with an aromatic dicarboxylic acid, up to 60% by weight of a polyester of terephthalic acid and a mixture of glycol and a polyhydric alcohol with at least 3 hydroxyl groups, and 0.1% to 12% by weight of an interesterifying catalyst; and (c) from 30% to 80% by weight of a high molecular weight polyester of a dihydric alcohol with an aromatic dicarboxylic acid, up to 50% by weight of an epoxy resin, up to 60% by weight of a polyester of terephthalic acid and a mixture of glycol and a polyhydric alcohol with at least 3 hydroxyl groups, and 0.1% to 12% by weight of an interesterifying catalyst.

6. An insulated conductor comprising a metallic electrical conductor, an inner dielectric coating of a polyester thermoset resin covering said conductor and an outer dielectric coating of a thermoset resin covering said inner coating, said outer coating subsisting in the form of an infusible and insoluble film and comprising from 30% to 80% of a high molecular weight polyester of a dihydric alcohol and an aromatic dicarboxylic acid, up to 50% by weight of an epoxy resin and 0.1% to 12% by weight of a cross-linking catalyst.

7. An insulated conductor comprising a metallic electrical conductor, an inner dielectric coating of a polyester thermoset resin covering said conductor and an outer dielectric coating of a thermoset resin covering said inner coating, said outer coating subsisting in the form of an infusible and insoluble film and comprising from 30% to 80% by weight of a high molecular weight polyester of a dihydric alcohol and terephthalic acid, up to 60% by weight of a polyester of terephthalic acid and a mixture of glycol and a polyhydric alcohol with at least 3 hydroxyl groups, and 0.1% to 12% by weight of a cross-linking catalyst.

8. An insulated conductor comprising a metallic electrical conductor, an inner dielectric coating of a polyester thermoset resin covering said conductor and an outer dielectric coating covering said inner coating, said outer coating subsisting in the form of an infusible and insoluble film and comprising up to about 50% by weight of epoxy resin, from about 30% to about 80% by weight of a polyester of a dihydric alcohol and an aromatic dicarboxylic acid, up to about 60% by weight of a polyester of an aromatic dicarboxylic acid and a mixture of glycol and a polyhydric alcohol having at least 3 hydroxyl groups and from about 0.1% to about 12% by weight of a cross-linking catalyst.

9. An insulated conductor comprising a metallic electrical conductor, an inner dielectric coating of a polyester-cyanurate thermoset resin covering said conductor and an outer dielectric coating covering said inner coating, said outer coating subsisting in the form of an infusible and insoluble film and comprising up to about 50% by weight of epoxy resin, from about 30% to about 80% by weight of a polyester of a dihydric alcohol and an aromatic dicarboxylic acid, up to about 60% by weight of a polyester of an aromatic dicarboxylic acid and a mixture of glycol and a polyhydric alcohol having at least 3 hydroxy groups, up to about 20% by weight of a polyvinyl acetal resin and from about 0.1% to about 12% by weight of a cross-linking catalyst.

10. An insulated conductor comprising a metallic electrical conductor, an inner dielectric coating of a terephthalate polyester covering said conductor, and an outer coating of a dielectric thermoset resin covering said inner coating, said outer coating subsisting in the form of an infusible and insoluble film and comprising up to 50% by weight of epoxy resin, from 30% to 80% by weight of a polyester of a dihydric alcohol and terephthalic acid, up to 60% by weight of a polyester of terephthalic acid and a mixture of glycol and a polyhydric alcohol having at least 3 hydroxyl groups, up to 20% by weight of a polyvinyl formal resin and from 0.1% to 12% by weight of zinc naphthenate.

References Cited by the Examiner

UNITED STATES PATENTS

| 2,691,006 | 10/1954 | Flory | 260—45.4 |
| 2,894,934 | 7/1959 | Burkhard | 260—45.4 |

FOREIGN PATENTS 591,161   1/1960   Canada.

JOSEPH B. SPENCER, *Primary Examiner.*

RICHARD D. NEVIUS, *Examiner.*